(No Model.)  5 Sheets—Sheet 1.
C. YOUNG.
KNITTING MACHINE.
No. 258,523. Patented May 23, 1882.
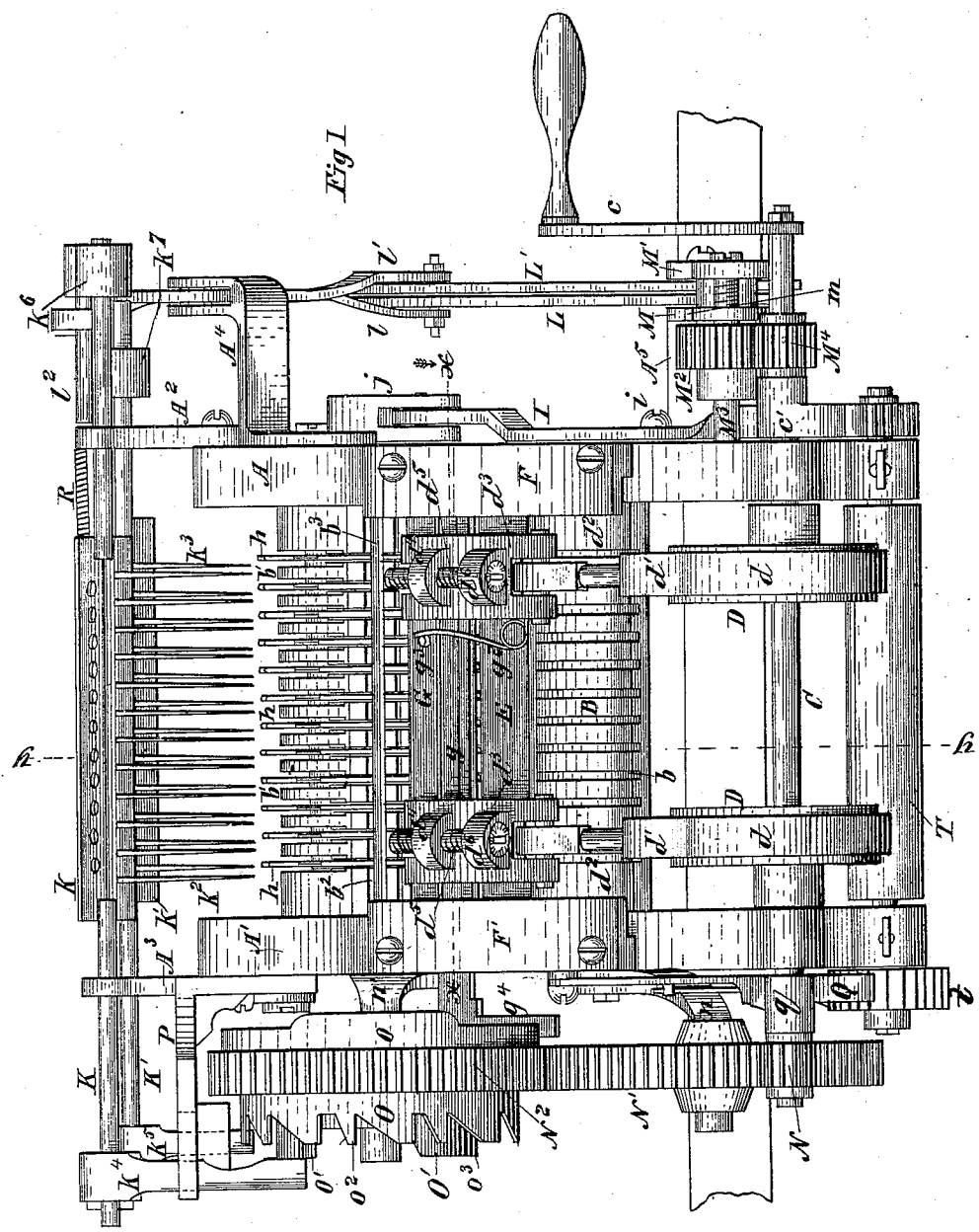
Witnesses
W. C. Corliss
A. C. R. Hollister
Inventor
Charles Young
By Coburn & Thacher
Attorneys

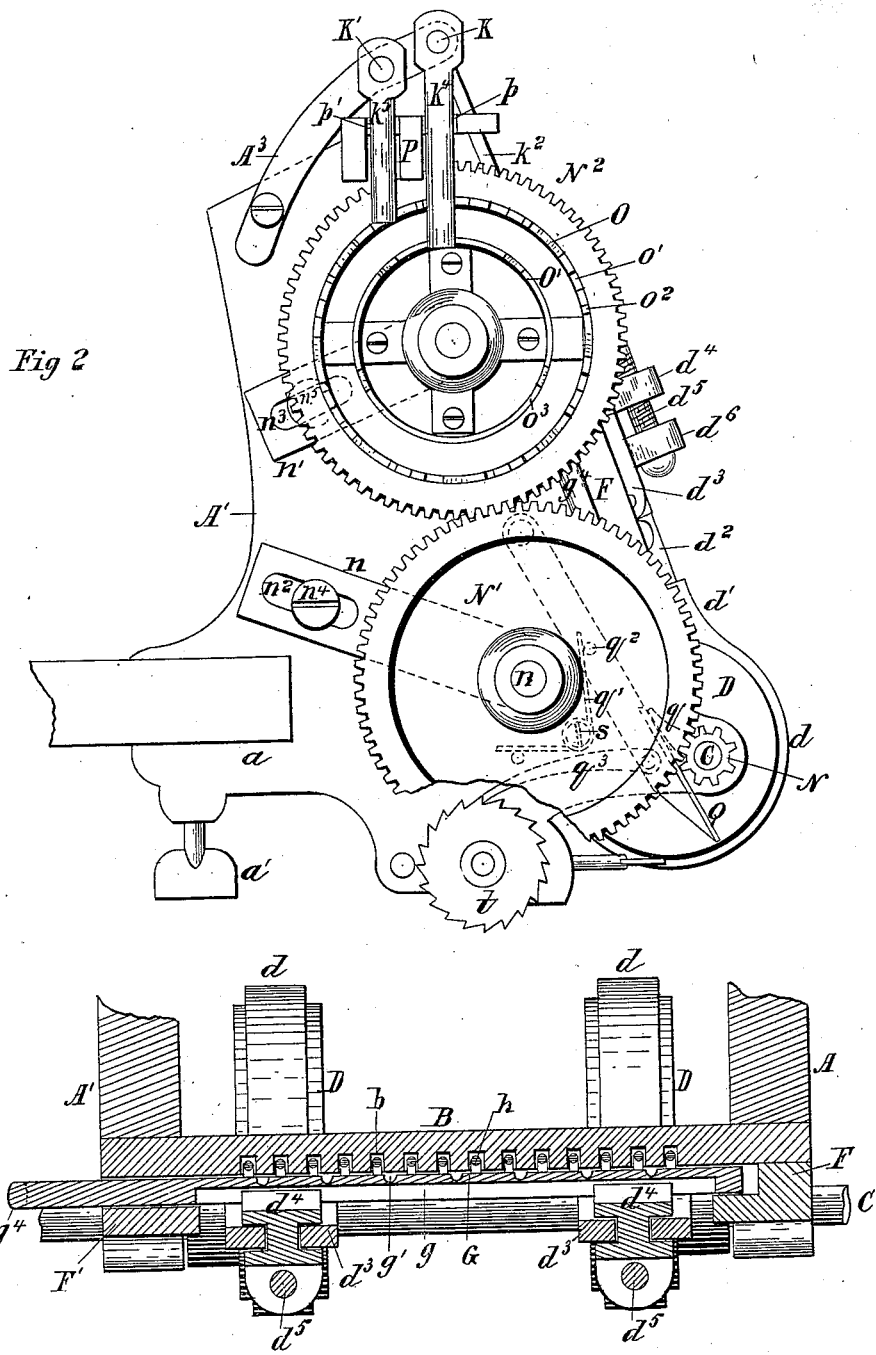

(No Model.) 5 Sheets—Sheet 3.
C. YOUNG.
KNITTING MACHINE.

No. 258,523. Patented May 23, 1882.

Witnesses

Inventor
Charles Young
By Coburn & Thacher
Attorneys (No Model.) 5 Sheets—Sheet 4.

C. YOUNG.
KNITTING MACHINE.

No. 258,523. Patented May 23, 1882.

Witnesses

Inventor
Charles Young
By Coburn & Thacher
Attorneys (No Model.) 5 Sheets—Sheet 5.

C. YOUNG.
KNITTING MACHINE.

No. 258,523. Patented May 23, 1882.

Witnesses
W. C. Coclies
Jno. C. MacGregor

Inventor
Charles Young
By Coburn & Thacher
Attorneys

UNITED STATES PATENT OFFICE.

CHARLES YOUNG, OF CHICAGO, ILL., ASSIGNOR, BY MESNE ASSIGNMENTS, OF ONE-HALF TO BENONA P. PRATT AND E. C. WALKER, OF SAME PLACE.

KNITTING-MACHINE.

SPECIFICATION forming part of Letters Patent No. 258,523, dated May 23, 1882.

Application filed June 23, 1880. (No model.)

*To all whom it may concern:*

Be it known that I, CHARLES YOUNG, a citizen of the United States, residing at Chicago, in the county of Cook and State of Illinois, have invented a certain new and useful Improvement in Knitting-Machines; and I do hereby declare that the following is a full, clear, and exact description of the same, reference being had to the accompanying drawings, in which—

Figures 4, 5:
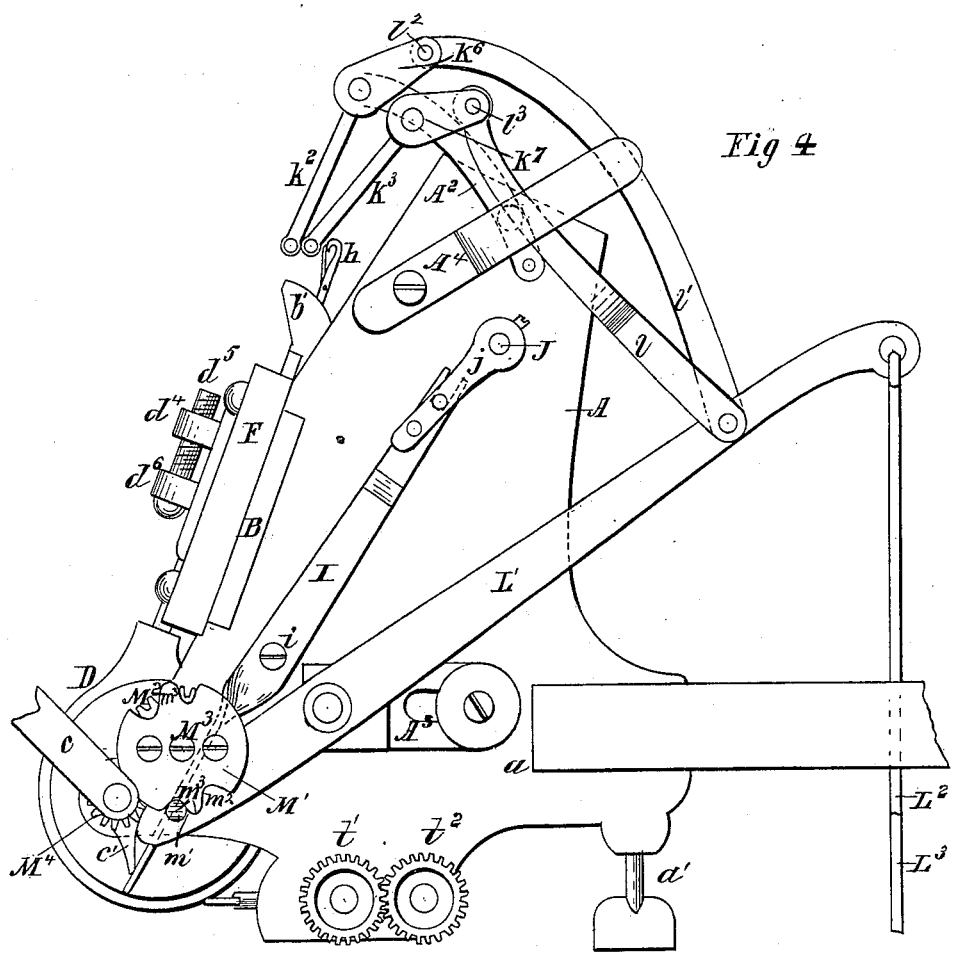
Figure 6:
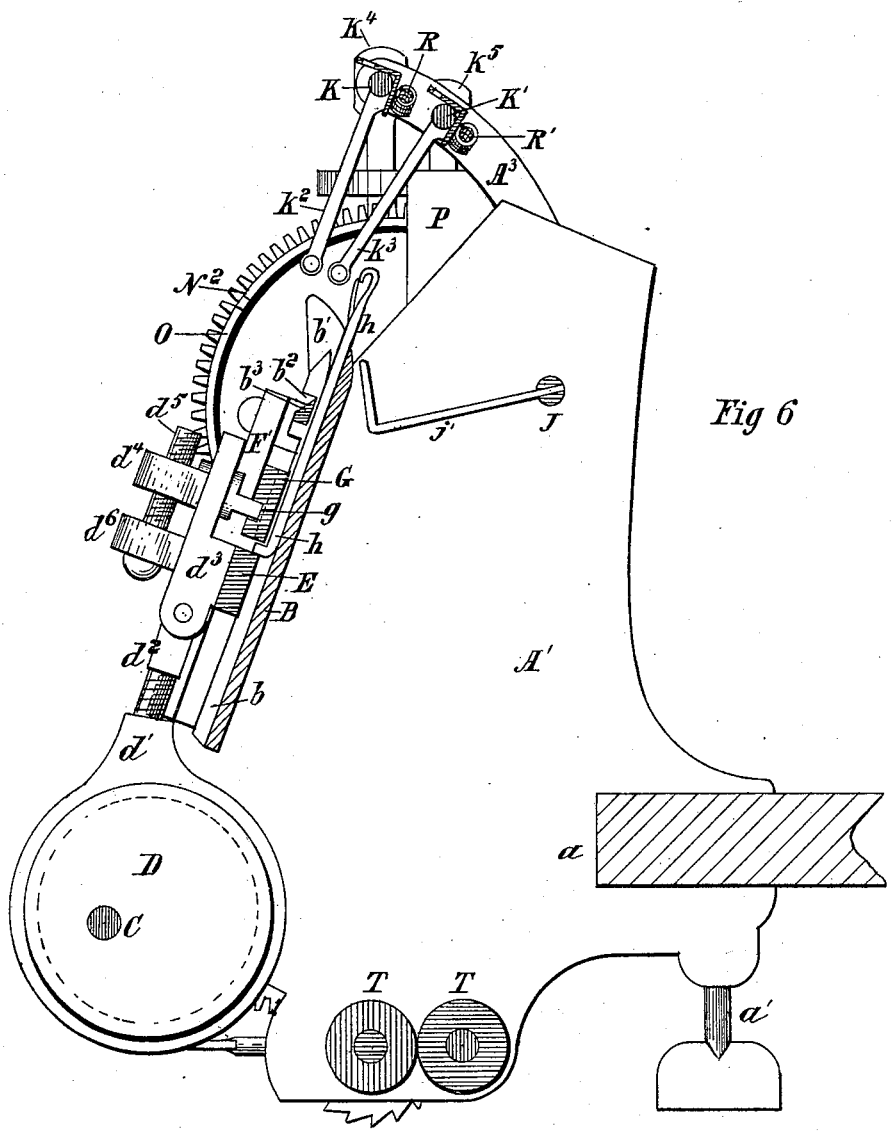
Figure 7:
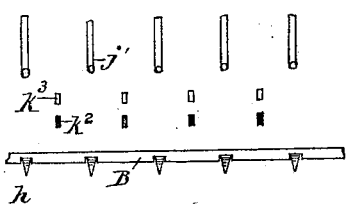
Figure 14:
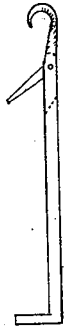

Figure 1 is a front elevation of my invention. Fig. 2 is a left end elevation, the lower of the large toothed wheels being partly broken away so as to show the ratchet-wheel and its pawl. Fig. 3 represents a section on the line $x\ x$ in Fig. 1, looking downward in the direction of the arrow. Fig. 4 is a right end elevation of the machine. Fig. 5 represents the form of the stitch made by the machine; and Fig. 6 represents a section on the line $y\ y$ in Fig. 1, the springs R and R' appearing in end elevation on the right of the section-plane. Figs. 7, 8, 9, 10, 11, 12, and 13 are plan diagrams, showing the successive positions of the thread (or yarn) carriers, needles, loop-hooks, and threads or yarns in the formation of the stitch. Fig. 14 is a detailed side elevation of one of the needles.

The same letters denote the same parts in all the figures.

My invention relates to machines for making knit fabrics; and it consists in the several devices and combinations of devices which I will now proceed to describe particularly.

A A' denote the end standards of the machine, having in their back edges the slots $a$, adapted to receive the edge of a shelf, table, or other like support, to which they may be fastened by the screws $a'$. To the front edges of the end supports is rigidly attached the needle-plate B, of about half their height and about equally distant between their upper and lower extremities. It slopes upward and backward for about five-sixths ($\frac{5}{6}$) of the distance between its upper and lower edges. Then its front surface becomes nearly perpendicular, while its rear surface inclines forward. On its front surface are cut a number of grooves, $b$, equally distant from each other and parallel with the right and left edges of the plate. These grooves are of equal depth relatively to the sloping front surface of the plate through-out their whole length and have the same direction throughout, so that they completely divide the plate at the upper edge into a row of tooth-like projections, $b'$. Across the front of this plate, from right to left, and just below the place where its surfaces change their direction, is cut a groove, $b^2$, about three times as wide as the grooves $b$ and at right angles to their direction. In this transverse groove is detachably set a catch-bar, $b^3$.

C denotes the main shaft, to which the power is applied by the crank $c$, or by any other suitable means. Rigidly attached to this shaft, so as to turn with it, are one or more pairs of eccentrics, D D, each pair being equally distant with each other from the right and left ends of the shaft, and the number of pairs being regulated by the length of the needle-plate B. The rim of each eccentric is flanged or grooved, so as to receive the band or shell $d$, which is not otherwise fastened to the eccentric, and which has at its highest point an upward projection, $d'$. Into a socket in this is set the connecting-rod $d^2$, adjustable in length according to the desired length of stitch by means of screw-threads on its lower portion and within the socket. The upper end of each connecting-rod is pivoted to the connecting-rod extension $d^3$, which is rigidly attached to the front surface of the needle-bar E, which lies close on the front surface of the plate B, up and down which it slides in the guides F and F'. Above the needle-bar, and parallel with it, is the stitch-varying bar G, having a longitudinal groove, $g$, on its front surface, into which project the lugs $d^4$ from the connecting-rod extension $d^3$. These lugs are adjustable in height by means of the set-screws $d^5$ and fixed lugs $d^6$, and the distance between the bars E and G may be thus varied as different lengths of stitch may be desired. On the back of the stitch-varying bar G are grooves $g'$, equally distant from each other, corresponding in breadth and direction to the grooves $b$ on the needle-plate, but only half (or some other fraction) as numerous. A groove in the guide F allows the bar G to have a second motion in a direction at right angles to that of the motion communicated to it by the connecting-rods; and the elasticity of the spring $g^2$, attached to the needle-bar E, and pressing against the right side of the pin $g^3$ on the stitch-varying bar G, forces the bar G against the inner flat surface of the wheel $N^2$, where it engages with the cam $o$ by the lug $g^4$, rigidly attached to the bar G at right angles to the length of the latter. The needles $h$, which slide in the grooves $b$, are of the ordinary construction, having at their upper ends hooks with movable latches, forming with them closed eyes, and at their lower ends heels, which, when the needles are in their lowest position, rest on the bar E and are pushed up by it when it ascends. When the bars E and G descend, the needles are pulled down by the stitch-varying bar G, the heels being between the two bars, except that at regular intervals, when in the lateral movement of the bar G the grooves in its rear surface correspond with a portion of those on the front surface of the needle-plate, the needles in these latter grooves are not pulled down with the rest, but remain standing, so that each of those needles retains its stitch until the succeeding one is formed, thus at regular intervals bringing two successive stitches close together and producing a knot or bead. The number of grooves $g'$ and the range of longitudinal motion of the stitch-varying bar may be so proportioned that all the needles shall in successive divisions register with the grooves $g'$, and the beaded or knotted stitches shall run in zigzag lines along the fabric. As shown in the drawings, each half of the needles will alternately form this peculiar stitch, which is principally used for shawls, and results in a pleasing variegation of the fabric.

Just to the right of the end standard A the driving-shaft C carries a cam, $c'$, projecting in a direction inclined at a little less than a right angle to the shortest radius of the eccentric-wheels and in a plane parallel to those wheels, so that when the eccentric-rods and the parallel bars, and consequently the needles, are at their lowest position this cam projects forward and slightly upward from the driving-shaft. About three-eighths ($\frac{3}{8}$) of a revolution of the shaft brings it into a position where it begins to press on the lower arm of the lever I, the needles being then not quite in their highest position. The pressure increases for rather more than one-eighth ($\frac{1}{8}$) of a revolution beyond this point, and then diminishes until, when about three-fourths ($\frac{3}{4}$) of a revolution from the point of starting is completed, the pressure is removed entirely and the lever returns to its position of rest. This lever I is pivoted to the standard A at $i$, its upper arm being somewhat longer than the lower. In the upper end is a slot extending to a point about equally distant from the pivot with the lower extremity. In this slot moves a pin which connects the two sides of a rocking arm, $j$, rigidly attached to the right end of the loop-hook shaft J, which thus rocks with the arm. The range through which it rocks may be adjusted by changing the position of the pin. The pressure of the cam $c'$ on the lower arm of the lever brings the upper arm forward and upward, communicating a like motion to the rocking arm $j$ and to the shaft J. To this shaft are attached the loop-hooks $j'$ $j'$. Each hook projects forward from the shaft, and has its forward end bent upward nearly at right angles. When the hooks are in their highest position this upwardly-bent portion is nearly perpendicular, and its upper end is therefore nearer to the needles than its lower end. In this position the tips of the hooks are about on a level with the points where the latches are attached to the bodies of the needles. The angle at which the hooks project may be adjusted by loosening a set-screw in the top of the rocking arm $j$, turning the loop-hook shaft, and then tightening the screw again.

The two upward extensions $A^2$ and $A^3$ of the end standards, A and A', support the front and back thread (or yarn) carrier shafts, K and K'. These pass through holes in the extensions just large enough for them to turn in, and are parallel to each other, the front shaft being slightly above the other. On these shafts are attached rigidly the thread (or yarn) carrier bars $k$ and $k'$, each bar being so bent at right angles to its length as to have two rectangular sides, one above and the other behind the shaft.

In the side, behind the shaft, are set the thread-carriers $k^2$ and $k^3$, projecting downward toward the needles, each set equal in number with them, and so long that when the needles are in their highest position the eyes in the lower ends of the thread-carriers will be about on a level with the eyes in the upper ends of the needles. These thread-carriers are of the usual form. The upper part of each bar has holes, through which the thread or yarn passes, corresponding in number and position to the thread-carriers. These thread-carriers receive from their shafts both a rocking motion and a motion in the direction of the length of the shafts. The latter is communicated to the shafts by their roller-bars $k^4$ and $k^5$, attached to the shafts nearly at right angles to their length and at their left ends. The rocking motion is communicated to the shafts by the rocking arms $k^6$ and $k^7$—the former rigidly attached to the right end of the front shaft, the latter to the back shaft at a point just outside of the right extension $A^2$. The rocking arm $k^7$ is in a nearly-horizontal position when the machine is set for the beginning of a stitch, the arm $k^6$ at the same time projecting upward at an angle of about forty degrees to the horizon. Through the outer ends of these arms pass the connecting-rods $l^2$ and $l^3$, which pass also through the connecting-rods $l$ and $l'$. These latter have a longitudinal motion in the guide $A^4$, which keeps them from veering laterally. They are pivoted to the levers L and L', respectively, near the upper ends of the latter, their direction being about at right angles to the levers L and L'. The levers L and L' are pivoted to the fulcrum A⁵, which is attached to the standard A so as to be adjustable backward and forward. The levers L and L' stand at an angle of about forty-five degrees to a perpendicular. The lower end of the lever L engages by means of a lateral projection or pin with the cam-wheel M, having in opposite sides of its periphery the notches $m$. The lower end of the lever L' engages in like manner with the cam-wheel M', having the pair of notches $m'$ and $m^2$, with the projection $m^3$ between them, on each of two opposite sides of its periphery. These cam-wheels are set on a common nave, so that the two notches and intervening projection on one are parallel to the single notch (which occupies about the same proportion of the circumference of the wheel) on the other. Rigidly attached to these wheels, and parallel with them, is the toothed wheel M², the three turning together on the shaft M³, which projects outward from the right end standard A parallel with the main driving-shaft, but above and behind it and just in front of the lower arm of the lever I. The teeth of this wheel engage with those of the pinion M⁴, which is rigidly attached to the main driving-shaft C, so that the cam-wheels M and M' are turned by the main shaft, but in an opposite direction to it. In the particular construction shown in the drawings the teeth of the wheel M² are twice as many as those of the wheel M⁴, so that there are two revolutions of the main shaft to one of the cam-wheels M and M'; but by reason of the duplication of the notches and projections the rocking of the thread-carrier bars is as frequent as the upward and downward motions of the needles and loop-hooks. The levers L and L' have weights attached to their upper ends by the cords or rods L² and L³, sufficient to keep their lower ends up when not forced out by the revolution of the cam-wheels.

On the main driving-shaft C, near its left end, is the pinion N, whose teeth engage with those of the wheel N'. The teeth of the wheel N' in the construction shown in the drawings are six times as many as those of the pinion N. The teeth of the wheel N' engage with those (the same in number) of the wheel N², whose center is nearly vertically above that of the wheel N', so that while the main shaft C makes six revolutions the wheel N² makes one in the same direction. The bearings $n$ and $n'$ of these wheels are set adjustably on the end standard by means of the slots $n^2$ and $n^3$ and the set-screws $n^4$ and $n^5$, so as to admit of attaching wheels of different diameters, in order to have a greater or less number of revolutions in proportion to those of the main shaft. In this way the kinds of fabric may be varied. From the rim of the wheel N², in a direction perpendicular to the plane of the wheel, and toward the end standard, projects the cam $o$, the proportion of the rim which it covers being determined by the proportion which the desired number of variegated stitches bears to the whole number of stitches. When this cam engages with the lug $g^4$ the bar G is pushed to the right, so that its grooves correspond with the fixed proportion of those on the needle-plate, and the same proportion of needles remain up while the others are pulled down, thus forming the peculiar beaded stitch already mentioned.

On the outer face of the wheel N² are the two concentric rims O and O'. From the rim O, which has the longer radius, project at equal distances from each other, and in a direction perpendicular to the plane of the wheel, several similar cams, $o'$ $o^2$, equal in number to the number of revolutions the main shaft makes while the wheel N² is making one. These cams engage the roller-bar $k^5$ on the end of the back carrier-bar. From the rim O', which has the shorter radius, project in like manner half that number of cams $o^3$, similar to each other, which engage the roller-bar $k^4$ on the end of the front thread-carrier bar. These cams project farther outward than those on the rim O, so as to engage the roller-bar $k^4$, the front thread-carrier bar projecting so much farther to the left than the other that the roller-bar on its left end is clear of the cams on the rim O. The roller-bar $k^5$, on the other hand, is so short as not to reach the rim O'. The cams on the rim O' might be equal in number to those on the rim O with substantially the same results. The two roller-bars move in directions parallel to each other in the slots $p$ and $p'$, respectively, of the guide P, which is affixed to the end standard A'. The coiled springs R and R', attached to the extension on the right end support, and at their other ends to the front and back thread-carrier bars, respectively, hold the thread-carrier bars in positions as far to the right as the cams on the rims O and O' will allow, so that when the roller-bars engage with the projections of their respective cams the thread-carriers are drawn to the left, and are released again as soon as the revolution of the wheel disengages the roller-bars.

On the main shaft C, between the standard A' and the pinion N, is a cam, $q$, projecting in a direction nearly parallel to that of the longest radius of the eccentrics D, so that just after the connecting-rods $d^2$ and $d^2$, and consequently the needles, have reached their highest position, and as they are beginning to descend, the outer end of this cam, beginning to move downward and backward, touches the lever Q, which is pivoted at its upper end on the outer side of the end standard, and is held in its position of rest by the pressure of the spring $q'$ (attached to the end standard at $s$) against the pin $q^2$, projecting to the left from the lever Q. This lever, being pressed backward by the cam, pushes back the pawl $q^3$, so that its rear end pushes against a tooth of the ratchet-wheel $t$ for about an eighth of a revolution of the main shaft and causes the ratchet-wheel to turn to a corresponding extent. This wheel is rigidly affixed to its axle, which turns in bearings in the two end standards, and which has rigidly affixed to it, just beyond A, the cog-wheel $t'$, whose teeth engage with those of a similar wheel, $t^2$, just behind, their centers being nearly in the same horizontal line. The axle of the wheel $t^2$, to which it is rigidly affixed, also turns in bearings in the two end standards. The two axles are parallel, and each has rigidly affixed to it on that portion of its length between the two end standards a roller, T, the diameters of the two rollers being such as to leave just sufficient space between them for the completed fabric to pass, it being gently drawn downward for the proper distance as each stitch is completed. These rollers have their outer surfaces of india-rubber or of some other material which will not exert a rigid pressure on the fabric. The cam and spring-lever may be so adjusted as to turn the rollers a greater or less distance at each revolution, according as the stitch is looser or closer.

To put the machine in operation, the pin on the lower end of the lever L', which rocks the back thread-carrier bar, must be in the first notch, $m'$, on its cam-wheel M'. The pin on the companion lever, L, will then be in the beginning of the corresponding notch, $m$, the cam which moves the loop-hook lever I about three-eighths ($\frac{3}{8}$) of a revolution will be in front of the position where it will begin to press on the lever, the needles will be so far up that their eyes will be in line with the eyes of the thread-carriers, the stitch-varying bar G will be clear of the cam $o$, so that its grooves do not correspond with those of the needles, the roller-bar on the left end of the back thread-carrier will be held out by the projection $o'$ on the outer flat surface of the wheel $N^2$, while the roller-bar $k^4$ of the front thread-carrier will be alternately at the end of the cam $o^3$ or of the notch which alternates with it.

Figures 8, 9:
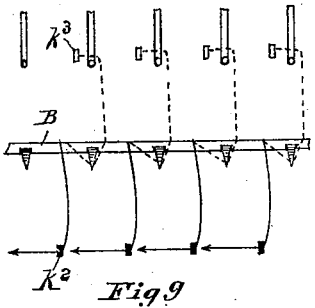
Figure 10:
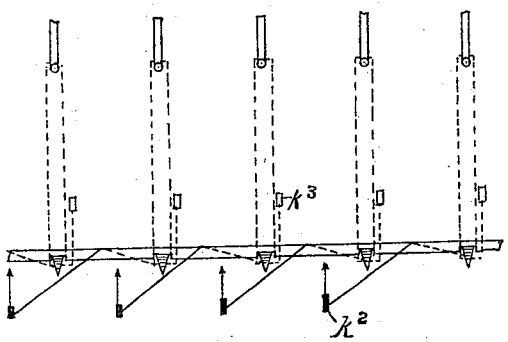
Figure 11:
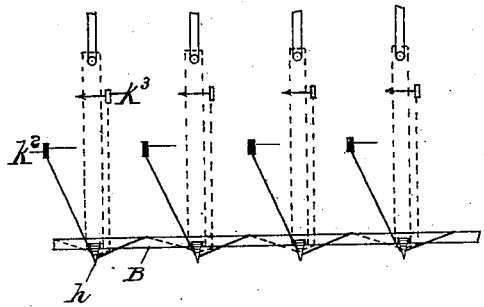
Figure 12:
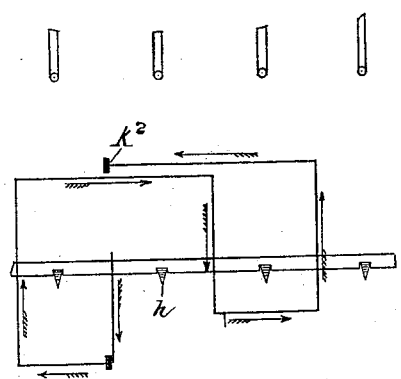
Figure 13:
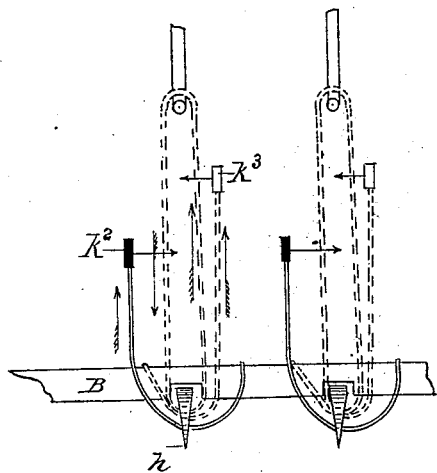

The machine is to be threaded with two sets of threads or yarns. Each thread or yarn of the one set is to be passed down through one of the holes in the back thread-carrier bar and from right to left through the eye of the corresponding thread-carrier, and is to be drawn down between the needle-plate and the corresponding loop-hook and between the take-up rollers. The threads of the other set are to be arranged in precisely the same way, except that they pass through the front thread-carrier bars and the eyes of the front thread-carriers. The two take-up rollers hold the lower ends of the threads firmly between them. The relative positions of the thread-carriers, needles, and loop-hooks in this stage are shown in Fig. 8 of the drawings. At the beginning of the revolution the needles rise, and at the same time with them the two sets of thread-carriers which are in front of them, the loop-hooks also rising, so as to be opposite the needles when these latter are in their highest position. The back thread-carriers move one needle to the right, drawing the thread along the face of the corresponding needle, then back behind the loop-hook, and then to the left, as shown in Fig. 9. Meanwhile the front thread-carriers have moved to the right or left (these directions alternating in successive stitches) one needle, as pointed out by the arrows in Fig. 9 and as actually shown in Fig. 10, the back thread-carriers then coming forward of the needles, and then to the right again, as shown in the same figure. Then both sets of thread-carriers go back between the needles and the loop-hooks, as shown in Fig. 11. Then the needles and loop-hooks go down, thus getting clear of the stitch, whose form at this stage is shown in Fig. 13. The front thread-carriers then move to the right or left, accordingly as they moved to the left or right before. Then both sets of thread-carriers come forward, and all is ready to begin a new series of movements. The course of the front thread-carriers and their threads alone is illustrated in Fig. 12. To make their direction clearer the threads are represented as passing around the needles at some distance from them, instead of crossing them in actual contact, as they do. In this mode of operation the front carriers knit with the needles the body of the fabric, on which the back carriers form the loops, the structure of the composite stitch being shown in Fig. 5.

What I claim as my invention, and desire to secure by Letters Patent, is—

1. The wheel $N^2$, provided with the indented rims O and O', in combination with mechanism for revolving it, and with the thread-carrier shafts K' and K, provided respectively with the roller-bars $k^5$ and $k^4$ for the purpose of communicating to the shafts a motion in the direction of their length, substantially as described.

2. The levers L and L', in combination with mechanism for depressing their lower ends and means for automatically depressing their upper ends, with fixed supports, with shafts or rods arranged in bearings in said supports and having rigidly-affixed rocking arms $k^6$ and $k^7$, and with connecting-rods $l$, $l'$, $l^2$, and $l^3$, substantially as and for the purpose described.

3. In a knitting-machine, first, a series of needles provided with heels at their lower ends; second, mechanism for giving them a longitudinal motion; third, a stitch-varying bar connected with this mechanism, arranged over the heels and at right angles to the directions of the needles, provided with grooves parallel to the needles large enough to allow the heels to pass through, and whose number is a divisor of the number of needles; and, fourth, mechanism operated by the same power which moves the needles, for giving to the bar a motion in the direction of its length, all in combination, substantially as and for the purpose described.

4. The combination of the main shaft, the cam $c'$, rigidly affixed thereto, the lever I, the rocking arm $j$, and the loop-hook shaft J, provided with the loop-hooks $j'$, substantially as and for the purpose described.

5. The combination of the grooved plate B, the needles $h$, the needle-bars E and G, the catch-bar $b^3$, the loop-hooks $j'$, thread-carriers $k^2$ and $k^3$, and take-up rollers T with mechanism for communicating to needles, loop-hooks, thread-carriers, and take-up rollers concordant motions from a single driving-shaft, substantially as and for the purpose described.

6. The combination of the grooved plate B, the needles $h$, catch-bar $b^3$, loop-hooks $j'$, thread-carriers $k^2$ and $k^3$, and take-up rollers T with mechanism for communicating to needles, loop-hooks, thread-carriers, and take-up rollers concordant motions from a common driving-shaft, substantially as and for the purpose described.

CHARLES YOUNG.

Witnesses:
THOMAS H. PEASE,
L. A. BUNTING.